United States Patent
Gerber et al.

(10) Patent No.: US 10,793,401 B2
(45) Date of Patent: Oct. 6, 2020

(54) VEHICLE FRAME FOR A MOBILE CRANE AND MOBILE CRANE

(71) Applicant: Liebherr-Werk-Ehingen GmbH, Ehingen (DE)

(72) Inventors: Martin Gerber, Schelklingen (DE); Gerd Breuning, Maselheim (DE); Alexander Patte, Almendingen (DE)

(73) Assignee: LIEBHERR-WERK EHINGEN GMBH, Ehingen (DE)

( * ) Notice: Subject to any disclaimer, the term of this patent is extended or adjusted under 35 U.S.C. 154(b) by 350 days.

(21) Appl. No.: 15/955,305

(22) Filed: Apr. 17, 2018

(65) Prior Publication Data
US 2018/0297824 A1 Oct. 18, 2018

(30) Foreign Application Priority Data
Apr. 18, 2017 (DE) .......................... 10 2017 003 730

(51) Int. Cl.
- B66C 23/62 (2006.01)
- B66C 23/78 (2006.01)
- B62D 21/12 (2006.01)

(52) U.S. Cl.
CPC .............. *B66C 23/62* (2013.01); *B62D 21/12* (2013.01); *B66C 23/78* (2013.01); *B66C 2700/0378* (2013.01)

(58) Field of Classification Search
CPC .......... B62C 23/62; B62D 21/12; B66C 23/78
See application file for complete search history.

(56) References Cited

U.S. PATENT DOCUMENTS

| | | | | |
|---|---|---|---|---|
| 3,302,806 A * | 2/1967 | Brown | .................... | B66C 23/36 414/341 |
| 3,734,223 A * | 5/1973 | Anderson | ................. | B60P 3/42 180/294 |
| 3,840,125 A * | 10/1974 | Cozad | ..................... | B66C 23/80 212/304 |
| 4,258,949 A * | 3/1981 | Keagbine | ................ | B66C 1/663 294/81.21 |
| 4,630,708 A * | 12/1986 | Thompson | .............. | B66F 11/04 182/12 |
| 4,762,192 A * | 8/1988 | Maxwell | ................... | B60P 3/40 180/14.2 |
| 6,631,817 B1 * | 10/2003 | Fleagle | ..................... | A61P 9/00 212/301 |
| 7,543,851 B2 * | 6/2009 | Wolfram | ................. | B66C 23/42 212/181 |

(Continued)

FOREIGN PATENT DOCUMENTS

| DE | 19728822 A1 | 3/1999 |
|---|---|---|
| DE | 60104955 T2 | 8/2005 |

*Primary Examiner* — John D Walters
*Assistant Examiner* — James J Triggs
(74) *Attorney, Agent, or Firm* — McCoy Russell LLP (57) ABSTRACT

The present disclosure relates to a vehicle frame for a mobile crane having a frame, in particular having a middle frame part that extends in the longitudinal vehicle direction, and having at least one sliding beam box for a support apparatus that is releasably bolted to a front-face rear end of the frame, wherein the bolting between the frame and the sliding beam box comprises at least two pins extending in the longitudinal vehicle direction and at least two pins extending transversely to the vehicle direction.

17 Claims, 12 Drawing Sheets

(56) References Cited

U.S. PATENT DOCUMENTS

| | | | | |
|---|---|---|---|---|
| 7,637,512 | B1* | 12/2009 | McGhie | B60P 1/54 |
| | | | | 280/404 |
| 9,284,165 | B2* | 3/2016 | Willim | B66C 23/82 |
| 2012/0228254 | A1* | 9/2012 | Holmes | B66C 23/18 |
| | | | | 212/242 |
| 2014/0224555 | A1* | 8/2014 | Qian | B62D 55/084 |
| | | | | 180/9.48 |
| 2018/0297824 | A1* | 10/2018 | Gerber | B66C 23/78 |

* cited by examiner

VEHICLE FRAME FOR A MOBILE CRANE AND MOBILE CRANE

CROSS REFERENCE TO RELATED APPLICATION

This application claims priority to German Patent Application No. 10 2017 003 730.2 entitled "VEHICLE FRAME FOR A MOBILE CRANE AND MOBILE CRANE," filed Apr. 18, 2017, the entire contents of which is hereby incorporated by reference in its entirety for all purposes.

TECHNICAL FIELD

The disclosure relates to a vehicle frame for a mobile crane having a middle frame part that extends in the longitudinal vehicle direction and having at least one sliding beam box for a support apparatus that is releasably bolted to the front-face rear end of the middle frame part.

BACKGROUND SUMMARY

Mobile cranes are moved to the location of use at the construction site in regular road traffic. The legal requirements of the traffic code accordingly have to be observed, in particular with respect to the maximum axle load and the permitted vehicle dimensions. In order not to exceed an axle load of 12 t (twelve metric tons) in the mobile crane, certain crane components have to be transported separately to the location of use with large cranes. The rear sliding beam box for a support apparatus of the mobile crane including the rear support, for example, has to be dismantled from the crane and transported separately to the construction site.

This means an increased effort for the customer on the assembly and dismantling of the crane, with said increased effort having to be kept as small as possible where possible. The vehicle frame typically comprises an elongate frame, in particular composed of an elongate middle frame part, to whose front-face end at the rear of the vehicle the sliding beam box can be bolted. This point of separation between the sliding beam box and the middle frame part, however, falls into a region of the structure under a heavy load during crane operation. The establishing of this point of separation accordingly requires a considerable effort of additional weight and costs that should be kept as small as possible.

Previous solutions for establishing a releasable point of separation use individual metal connection plates at the middle frame part for the reception of the connection pins. In crane operation, these metal plates are subject both to shear stress and to bending stress, with the subjection of these metal connection plates to bending stress being mechanically inefficient, however.

Figure 1A:
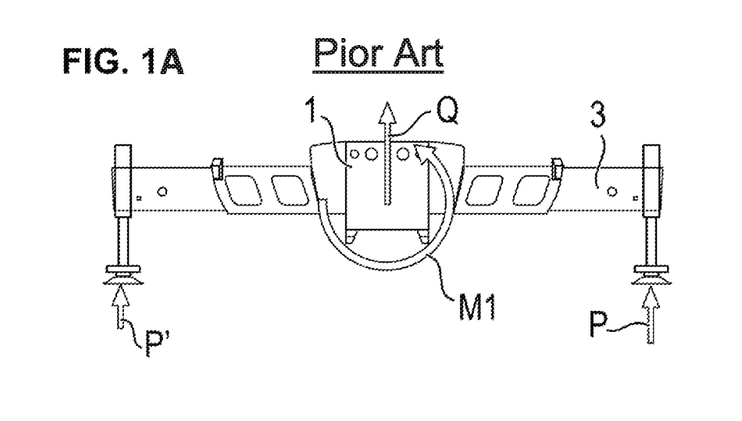
FIGS. 1A and 1B show a rear view and a side view, respectively, of the sliding beam box with received supports in accordance with the prior art.
Figure 1B:
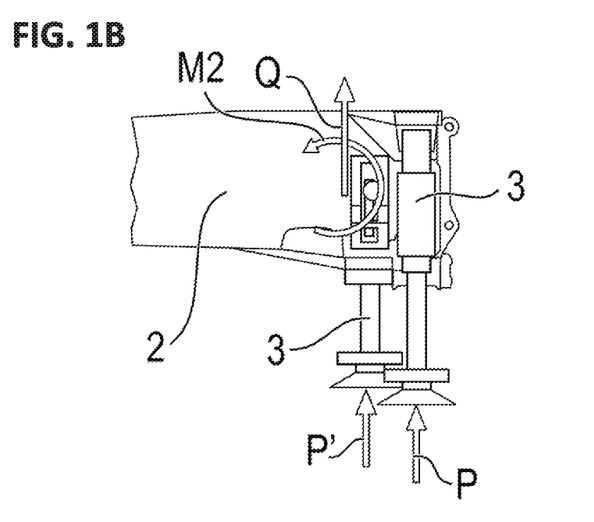

FIGS. 1A-1B show a conventional sliding beam box 1 including the support elements 3, also called sliding beams, from different angles of view. In crane operation, the compressive forces P, P' act on the outer supports 3 and cause the torques M1; M2 at the connection point (point of separation) of the sliding beam box 1 to the middle frame part 2.

Figure 2A:
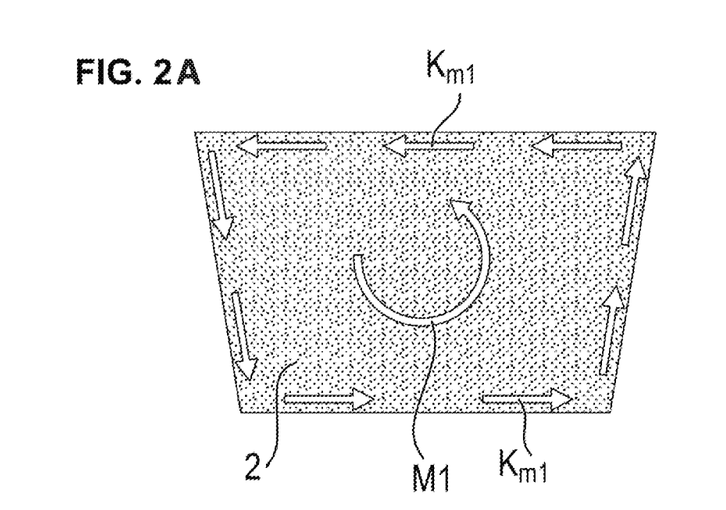
FIGS. 2A and 2B show schematic representations of the middle frame part with the forces occurring during the crane operation.
Figure 2B:
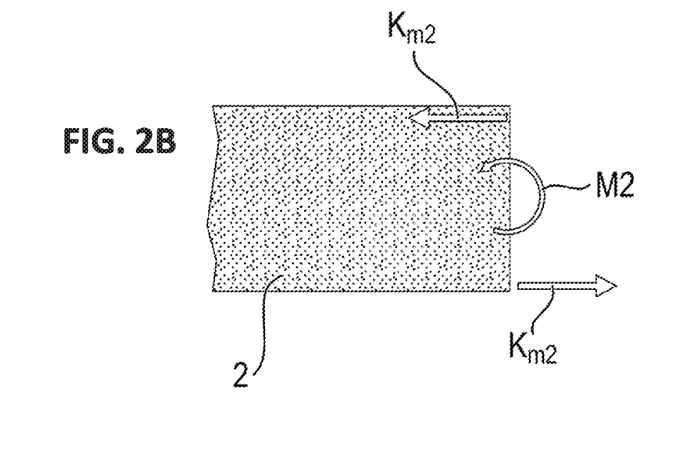

The torques M1 and M2 in accordance with FIGS. 1A-1B can, as shown in FIGS. 2A-2B, be transmitted with the marked forces $K_{m1}$ (peripheral shear flow, FIG. 2a), $K_{m2}$ (force pair FIG. 2B). FIG. 2A shows a view in the longitudinal vehicle axis while FIG. 2B represents a side view of the middle frame part 2. The force transmission/force introduction of the torque M2 at the point of separation in accordance with FIG. 2b is comparatively simple since the torque M2 or the force pair $K_{M2}$ can be transmitted via a compressive force in the top chord by means of an abutment and a tensile force can be transmitted by means of two pins in the bottom chord. What is technically more difficult is the implementation of the force transmission of the torsional moment M1, characterized by the continuous shear flow $K_{M1}$ in accordance with FIG. 2A. The shear forces continuously revolving in the outside fiber are typically transmitted in concentrated form at pins or abutments.

Figures 3A, 3B, 3C:
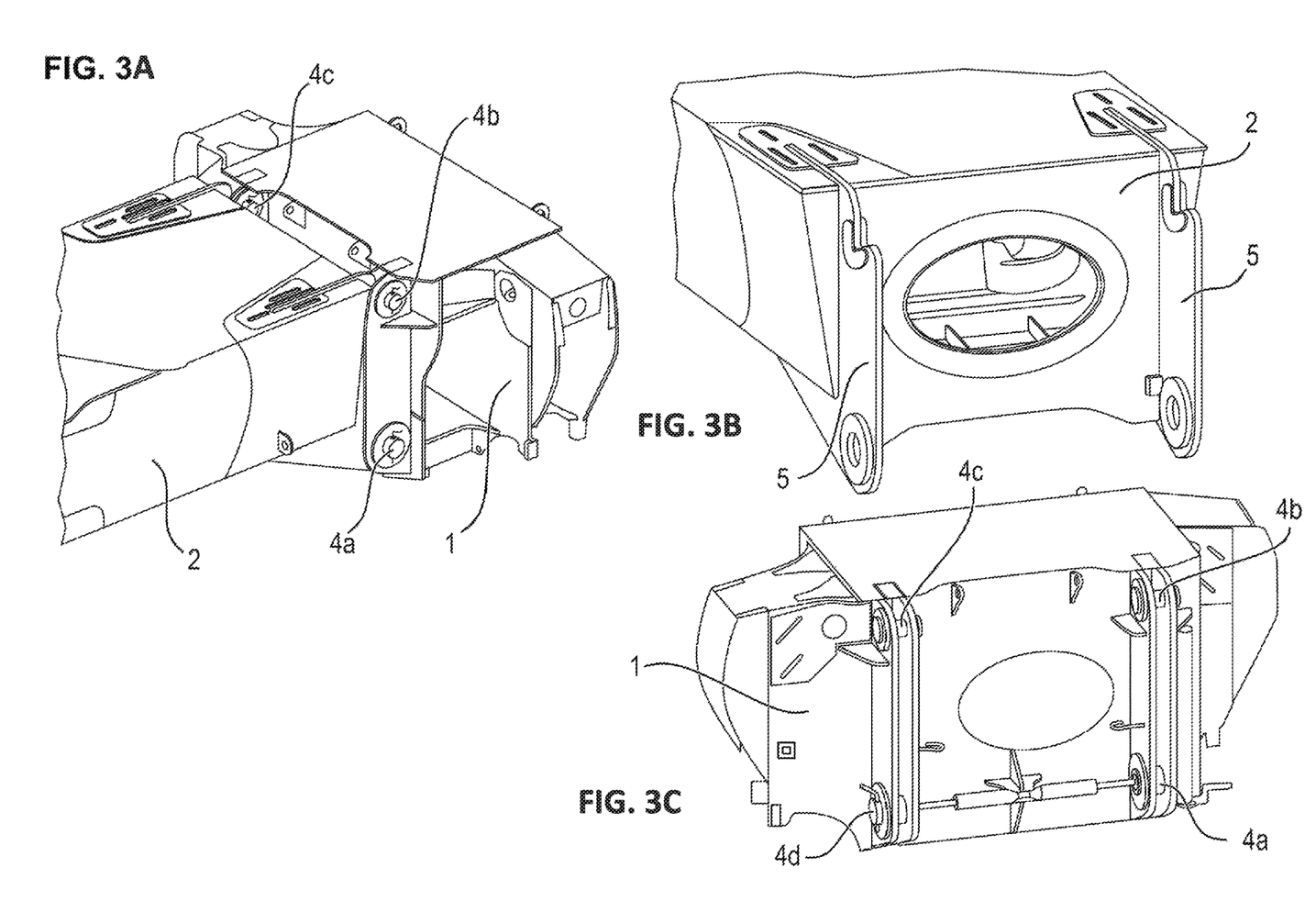
FIGS. 3A, 3B and 3C show various representations of the conventional design of the point of separation between the sliding beam box and the middle frame part.

The previous pin connection of the point of separation between the middle frame part 2 and the sliding beam box 1 is shown in FIGS. 3A-3C. The load transmission or force transmission takes place via a total of four pins 4a-4d that all extend transversely to the longitudinal vehicle axis. The two metal connection plates or connection tabs 5 extend perpendicular on the front-face end of the middle frame part 2 with matching bores to the receiver of the connection pins 4A-4D.

The main disadvantage of the previous solution comprises the different stiffnesses for shear and bending with dimensions typical for components. This can be illustrated with the aid of the representations in FIGS. 4A-4D. FIG. 4A again shows all the forces of the shear flow $K_{M1}$ generally present at the bolting points 4A-4D.

Figure 4A:
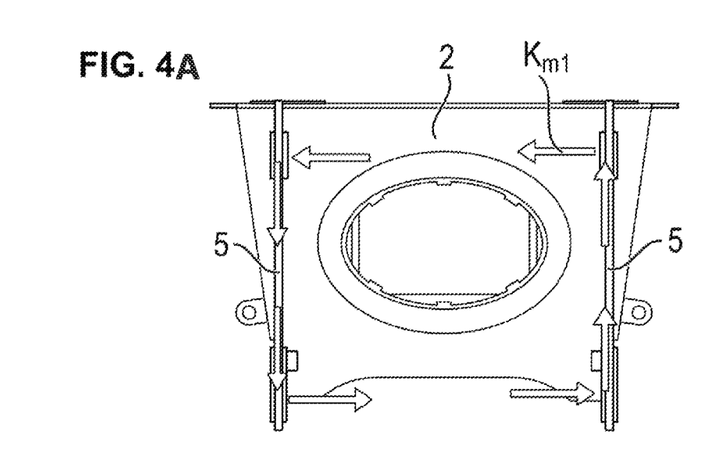
FIGS. 4A, 4B, 4C and 4d show schematic representations of the middle frame part with the individual forces occurring in the region of the connection points in accordance with the conventional solution.
Figure 4B:
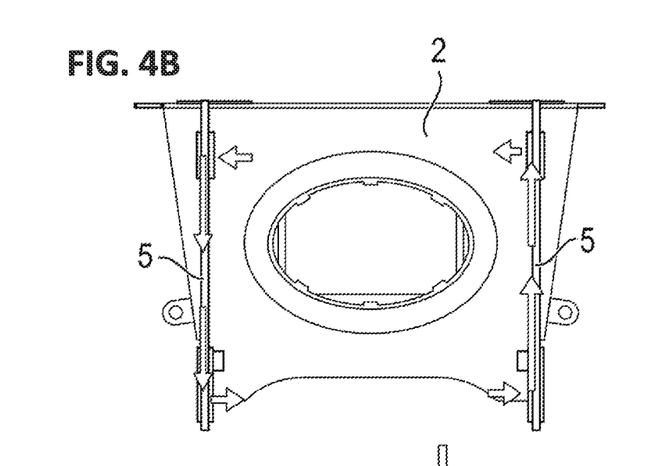
Figure 4C:
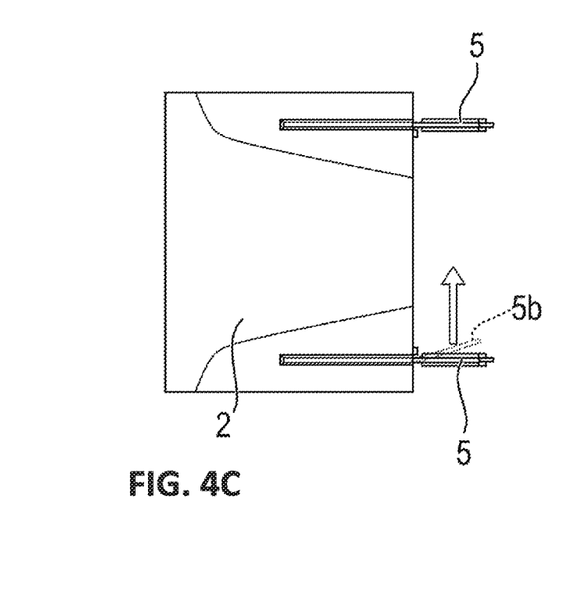
Figure 4D:
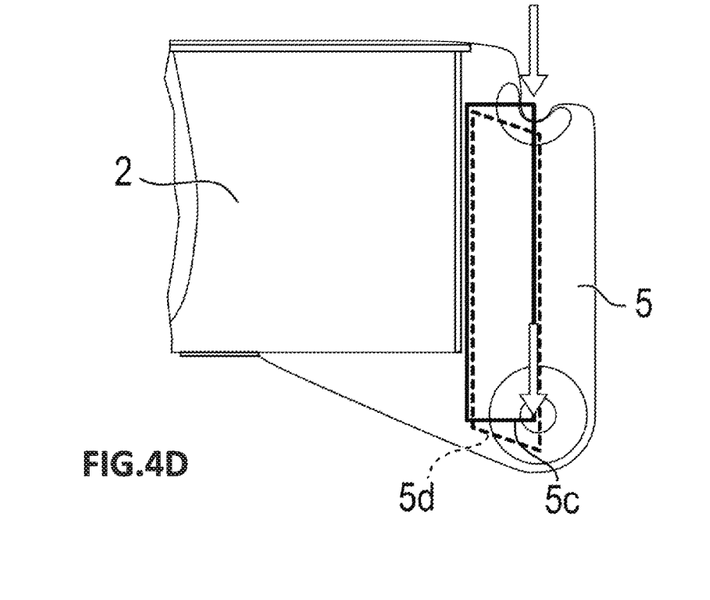

The horizontal portion of the applied forces effects a bending deformation of the tabs 5, which is indicated by reference numeral 5b in FIG. 4A. The vertical force portion effects a shear deformation of the tabs 5. FIG. 4D shows the contour of the unloaded and consequently not deformed tabs 5c and also the contour of the tab 5b deformed due to shear. Since the bending stiffness of the tabs 5 is smaller than its thrust stiffness by at least the power of ten, the force relationships shown in FIG. 4B are adopted with typical component dimensions. Very high vertical loads and horizontal forces small in relation thereto accordingly occur. This has the result that the height of the middle frame part 2 plays a subordinate role for the transmission of the torsional moment M1 can consequently not be mechanically exploited.

Figure 5:
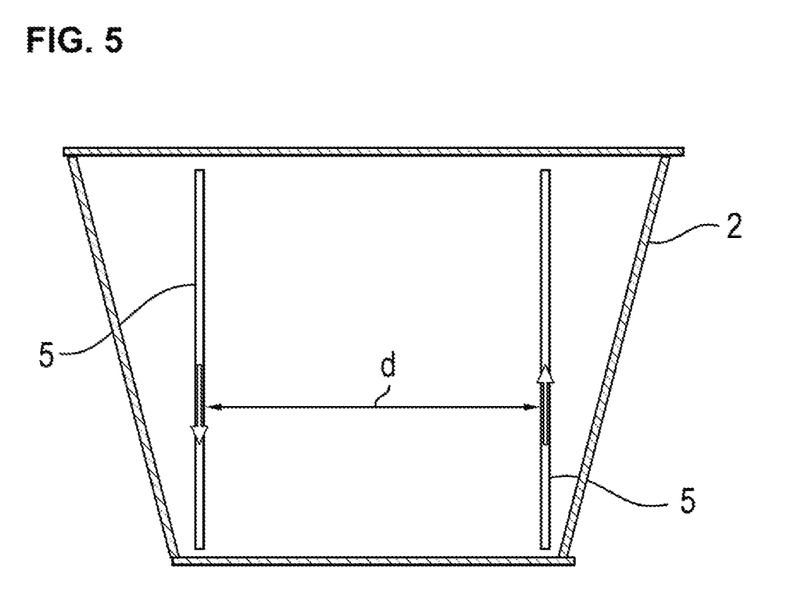
FIG. 5 shows a sketch of a cross-sectional representation of the middle frame part.

With the previous design, there is additionally a further disadvantage that in particular occurs on the use of a trapezoidal profile for the design of the middle frame part 2. The trapezoidal profile shape is shown in FIG. 5. The magnitude of the vertical force pair is substantially determined by the distance d from the two lugs 5 between one another. With conical profile shapes, the width is, however, determined by the smaller of the two chords, i.e. here by the bottom chord of the middle frame part 2. The forces in the tabs 5 are thereby also increased.

A solution is therefore sought that permits a force transmission via the point of separation between the middle frame part and the sliding beam box primarily via shear both in the horizontal direction and in the vertical direction.

This object is achieved by a vehicle frame for a mobile crane having a frame having a middle frame part that extends in a longitudinal vehicle direction, and having at least one sliding beam box for a support apparatus that is releasably bolted to a front-face rear end of the frame, wherein the bolting between the frame and the sliding beam box comprises at least two pins extending in the longitudinal vehicle direction and at least two pins extending transversely to the vehicle direction. Embodiments of the vehicle frame are the subject of the dependent claims.

The starting point is a vehicle frame for a mobile crane that comprises a middle frame part that extends in the longitudinal vehicle direction. A dismantlable sliding beam box for a support apparatus is releasably installed, in particular bolted, at the front-face rear end of the middle frame part.

It is proposed in accordance with the present disclosure to implement the bolting between frames, in particular the middle frame part and the sliding beam box, by means of at least two pins extending transversely to the vehicle direction and also by means of at least two pins extending in the longitudinal vehicle direction. The use of pin connections whose pins extend in different directions ensures a force transmission via shear in the point of separation between the frame and the sliding beam box. A substantial advantage of the proposed solution comprises the fact that both the height and the width of the cross-section of the point of separations, i.e. of the sliding beam box and of the frame, can be used in a decisively relevant manner and therefore completely for leading away the previously discussed torsional moment M1 at the point of separation between the frame and the sliding beam box. The individual forces that occur are then balanced and can be forwarded more easily into the following steel structure.

In accordance with an advantageous embodiment of the disclosure, the pins extending in the vehicle direction extent perpendicular from or through the end-face front side of the frame that defines the contact surface of the frame with the sliding beam box. The pins can selectively be fixed to the frame and can be insertable into corresponding pin receivers at the sliding beam box. Alternatively, however, they can also be fixedly installed at the sliding beam box and can be inserted into corresponding receivers of the frame.

It is particularly advantageous if the surface of the sliding beam box and/or of the frame serves as a force transmission surface in the region around at least one pin extending in the longitudinal vehicle direction. Ideally, a force transmission surface is machined in the region around the at least one pin while the oppositely disposed contact surface has a corresponding machining that may be applied to the counterpiece with an exact fit.

It has furthermore proved particularly advantageous if the contact surface of the sliding beam box is formed by an adapter plate corresponding to the profile form of the frame placed on the side wall of the sliding beam box. In this case, the adapter plate can comprise the aforesaid elevated portion or recess.

A design having at least two pins extending in the longitudinal vehicle direction in the region of the top chord of the frame and sliding beam box has proved particularly suitable. The at least two pins oriented transversely to the vehicle direction are advantageously provided in the region of the bottom chord of the middle part or of the sliding beam box.

The realization of the pin connection without any additional metal connection plates has the advantage that unlike the design of the prior art with two tabs mounted at the side parts, the horizontal distance between the pin connections of the top chord and/or the bottom chord can differ. This permits different profile forms of the frame or of the sliding boom box to be completely utilized for the force transmission. A conical profile form of the frame can be named as an example so that the horizontal distance between the pins of the top chord can be larger than the distance between the pins of the bottom chord.

In accordance with a further embodiment, it can be advantageous for at least one dog to be provided for transferring transverse forces, in particular forces horizontal in the transverse vehicle direction. It can sensibly be disposed in the region of the bottom chord of the frame or of the sliding beam box. An arrangement may be between the at least two pins extending transversely to the direction of travel in the bottom chord, particularly centrally between these at least two pins. It also applies in this connection that the dog can be selectively fastened to the frame or alternatively to the sliding beam box.

The dog engages into a complementary receiving element of the oppositely disposed component of the point of separation to connect the sliding beam box and the frame in a shape matching manner, which permits the transmission of transverse forces.

One or more centering aids can be provided at the frame and/or at the sliding beam box for installation purposes, for example in the form of a suspension means, whereby the sliding beam box can be suspended into corresponding support points of the frame and is pivotable into the desired installation position for the plugging of the pins. Suitable support pins are formed by metal plates projecting laterally at the frame and having openings for receiving corresponding transverse pins of the sliding beam box. If these transverse pins lie on the support points of the frame, the sliding beam box can be pivoted about a horizontal axis with respect to the frame.

It is meaningful for the establishing of the pin connection that at least some of the pins are hydraulically adjustable.

Since the individual support feet to be accommodated in the sliding beam box optionally comprise electrical and/or hydraulic consumers, a hydraulic and/or electric coupling has to be provided in the region of the point of separation. An automatic coupling establishing during the installation procedure of the sliding beam box is desirable. For this purpose, complementary coupling parts are provided both at the frame and at the sliding beam box and are equipped with corresponding plug parts or hydraulic coupling plugs and/or coupling sleeves. This quick coupling permits the simultaneous production of the corresponding hydraulic lines or electrical lines as part of the customary mechanical installation procedure.

To be able to join the two coupling parts together with an exact fit during the installation procedure, it is particularly advantageous if at least one coupling part is movably supported at the corresponding component, i.e. either at the frame or at the sliding beam box, whereby slight deviations from the exact installation position can be compensated. It is conceivable in this connection that the movably supported coupling part is resiliently received in or at a corresponding support plate, with this support plate ideally being movably supported at the middle frame part or sliding beam box. An implementation of the movable support of a coupling part by means of a linear guide is sensible so that the movably supported coupling part can be displaced in the direction of the linear guide. The support plate of the coupling part is ideally displaceably seated on a linear guide. The linear movement of the coupling part can be generated by a suitable drive, for example by a piston-in-cylinder arrangement. The linear guide furthermore may be fixed to the vehicle frame, in particular to the frame.

An equipping of at least one coupling part with at least one guide pin is equally sensible, with said guide pin engaging into a corresponding centering bore of the oppositely disposed coupling part with a coupling fit. The rough centering of the two coupling parts during the installation procedure already takes place by the pin connections in accordance with the disclosure between the frame and the sliding beam box. A fine centering is achieved by the aforesaid one or more centering pins.

In addition to the vehicle frame in accordance with the disclosure, the present disclosure also applies to a corresponding vehicle frame in accordance with the present disclosure. The advantages and properties of the mobile crane accordingly correspond to the advantages and properties already described above. A repeat description is dispensed with for this reason.

Embodiments of the disclosure will be explained in more detail in the following with reference to an embodiment shown in the drawings.

The prior art has already been discussed in detail in the Background Summary section and should no longer be further discussed at this point. An embodiment of the disclosure will be explained in the following. Different representations of the middle frame part 20 and of the sliding beam box 10 with the newly designed pin connections are shown in FIGS. 6a-6c.

Figure 6A:
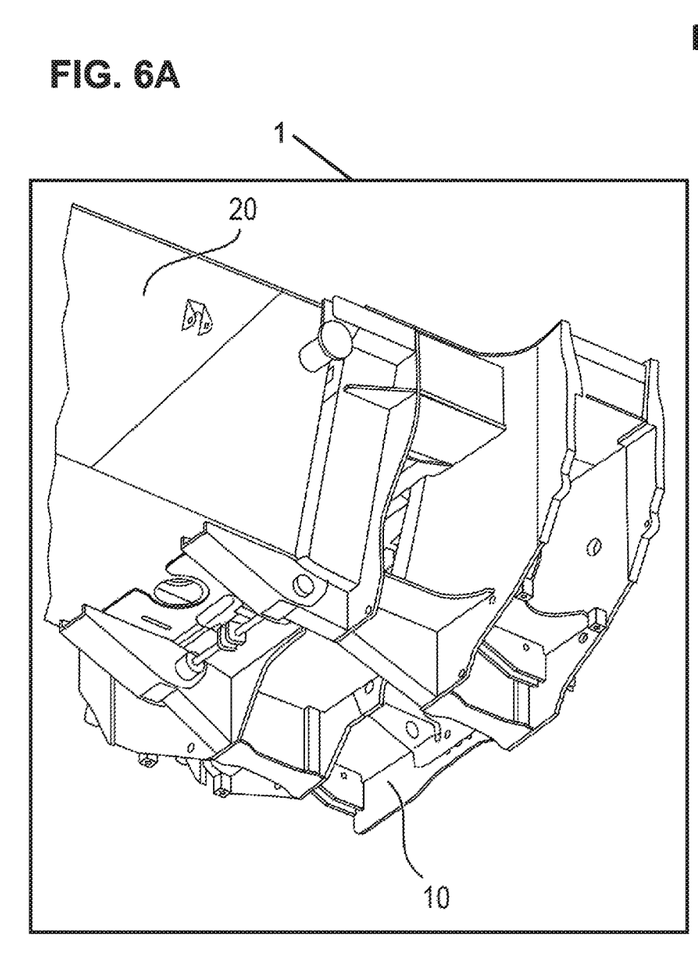
FIGS. 6A, 6B and 6C show various representations of the vehicle frame in accordance with the disclosure.
Figures 6B, 6C:
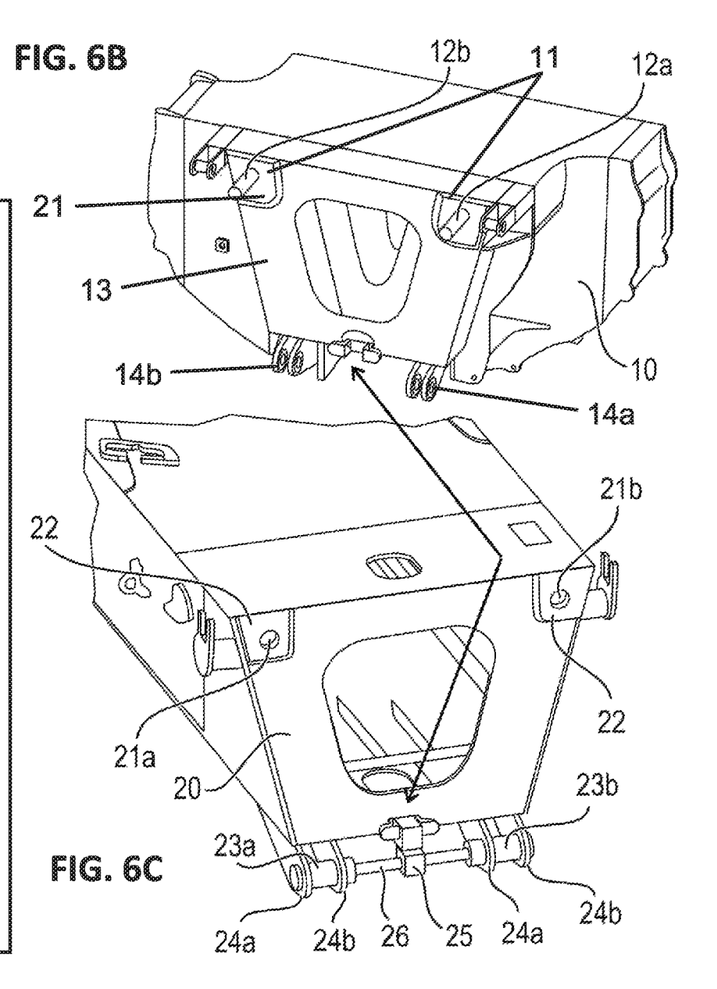

FIGS. 6A-6C show representations of the vehicle frame in accordance with the disclosure. The vehicle frame may be for a mobile crane 1. In detail, FIG. 6A shows a detailed view of the sliding beam box 10 bolted to the front-face end of the middle frame part 20; FIG. 6B shows a detailed view of the contact transmission surface or force transmission surface 13 of the sliding beam box 10; and FIG. 6C shows a detailed view of the end-face front side of the middle frame part 20 for receiving the sliding beam box 10.

The frame middle 20 has a substantially conical profile form whose top chord is selected as wider than the bottom chord. The two pin receivers 21a, 21b that are disposed in the corner regions of the top chord at the middle frame part 20 can likewise be recognized in FIG. 6c. The total width of the profile, i.e. the total width of the top chord, is accordingly utilized by the arrangement of the pin receivers 21a, 21b.

The front side of the middle frame part 20 has elevated portions 22 around the bores 21a, 21b, with said elevated portions being able to be formed by placed on metal plates, for example.

Two pins 23a, 23b oriented transversely to the longitudinal vehicle axis can be recognized in the region of the bottom chord of the middle frame part, with each pin 23a, 23b being respectively held by two parallel tabs 24a, 24b having a corresponding bore for the pin. The bar 26 connects both single pins 23a, 23b so that they can together be actuated via hydraulics. This arrangement of the pins 23a, 23b also utilizes the complete width of the bottom chord. A dog 24 is additionally formed centrally between the two pins 23a, 23b at the bottom chord of the middle frame part 20. The provision of two dogs is also possible.

A view of the corresponding complementary force transmission surface of the sliding beam box 10 is formed by an adapter plate 11 that is placed on the side wall of the sliding beam box and that is based on the profile form of the middle frame part. The adapter plate 11 comprises pins 12a, 12b that project perpendicular from the contact surface that extend in the longitudinal vehicle direction, and that can be plugged into the bores 21a, 21b of the middle frame part 20 in the corner regions of the top chord. The pins 12a, 12b are also hydraulically actuable, with the corresponding drive being able to be accommodated within the adapter plate 11 and/or the sliding beam box 10.

Figure 9:
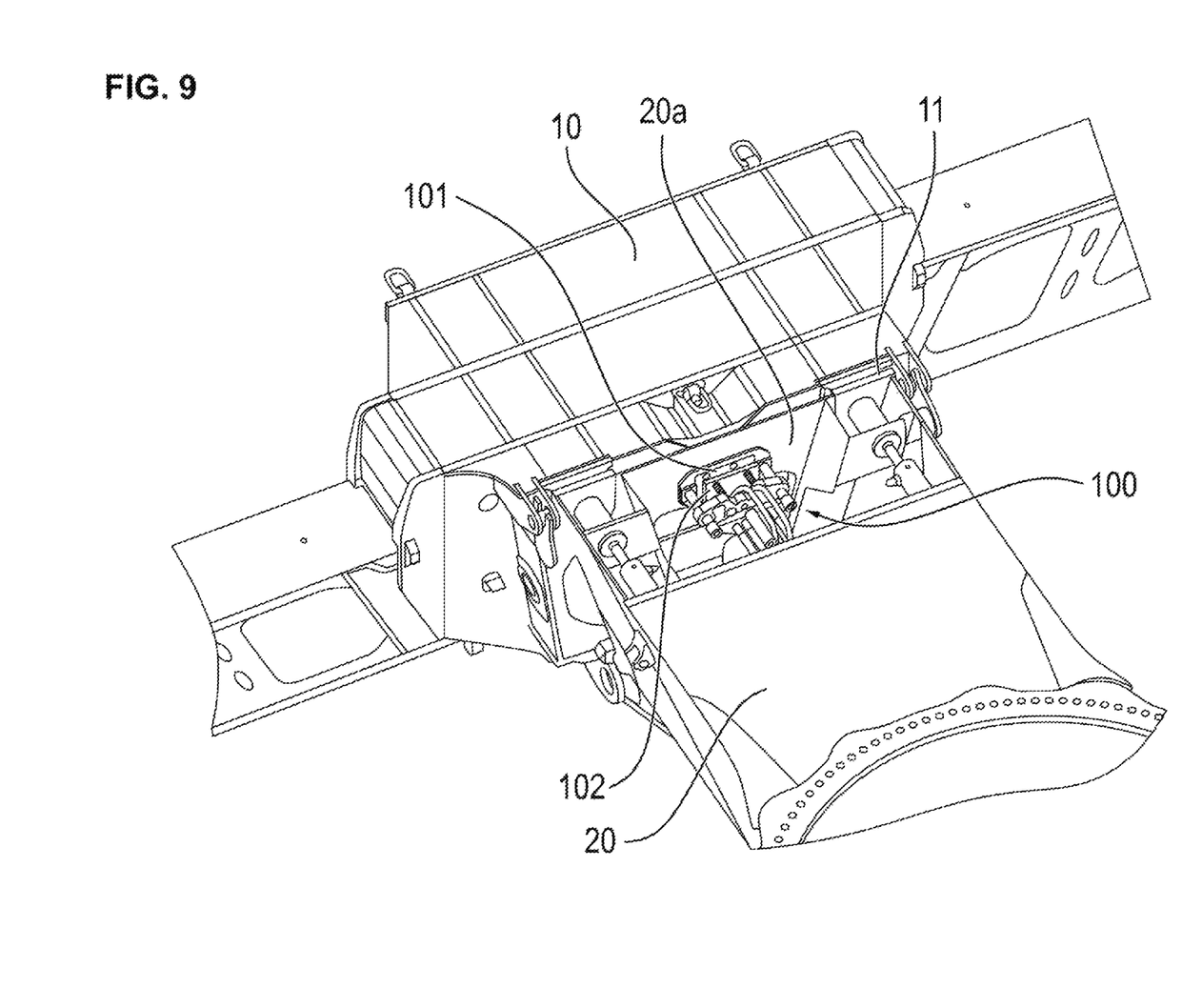
FIG. 9 shows a further representation of the solution in accordance with the disclosure with an integrated quick coupling.

In the region around the pins 12a, 12b, the adapter plate 11 also has machined contact surfaces that correspond with the shape of the elevated portions 22 of the middle frame part so that the elevated portions 22 can be placed at the contact surfaces 21 of the adapter plate 11, which considerably improves the transmission of the compressive forces (in accordance with FIG. 9).

Corresponding fork elements 14a, 14 are provided in the corner regions in the bottom chord and their openings are disposed flush with the openings of the tabs 24a, 24b for the bolting to lead the pins 23a, 23b through the tabs 24a, 24b and the fork elements 14a, 14b.

A recess for the shape-matched reception of the dog 25 is formed centrally between these fork connections 14a, 14b.

Figure 7A:
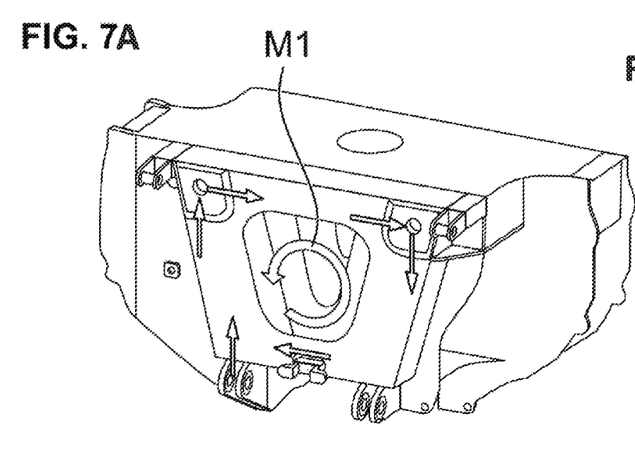
FIGS. 7A, 7B, 7C and 7D show various representations of the force flow in the solution in accordance with the disclosure of FIGS. 6A-6C.
Figure 7B:
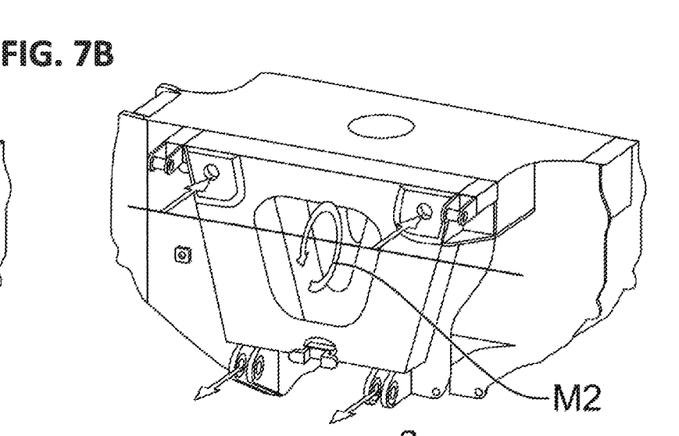
Figure 7C:
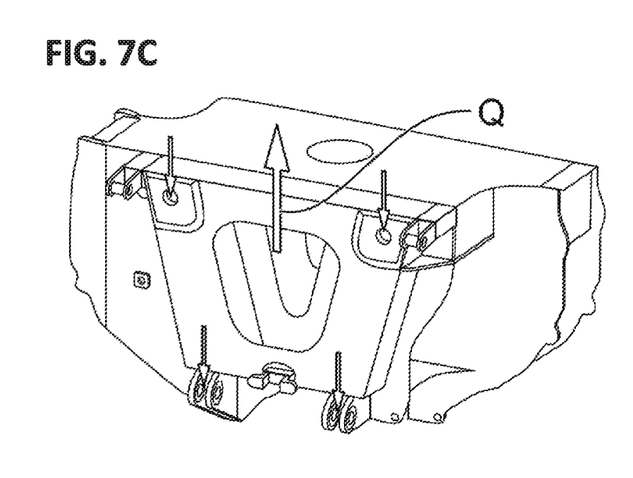
Figure 7D:
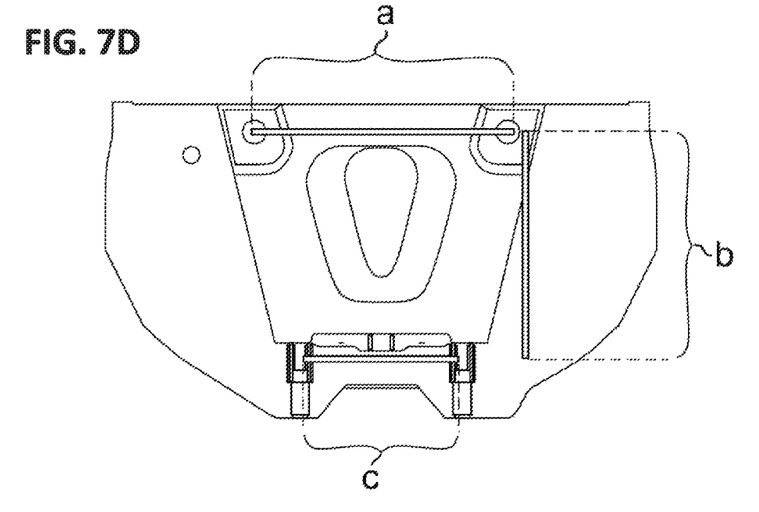

The force transmission between the middle frame part 20 and the sliding beam box should be illustrated with the aid of FIGS. 7A to 7D. The illustration of FIG. 7A shows the transmission of the torque M1 that is in balance with the reaction forces shown (revolving shear forces) at the connection point between the sliding beam box 10 and the middle frame part 20. The connection stiffnesses at the transmission points move in a similar order of magnitude. The torque M2 and the transverse force Q are also transmitted in the form of shear forces via the four pin connections (see FIGS. 7B, 7B).

The main advantage of the new design of the point of separation comprises both the height and the width of the cross-section being decisively relevant for the leading off of the torsional moment M1. This is emphasized by the representation of FIG. 7D that shows the lever arms defined by the distances of the individual pins, i.e. the lever arm of the length a, two times a lever arm of the length b, and one time a lever arm of the length c. The force pairs fixed by the lever arms transmit the torque M2.

Figure 8:
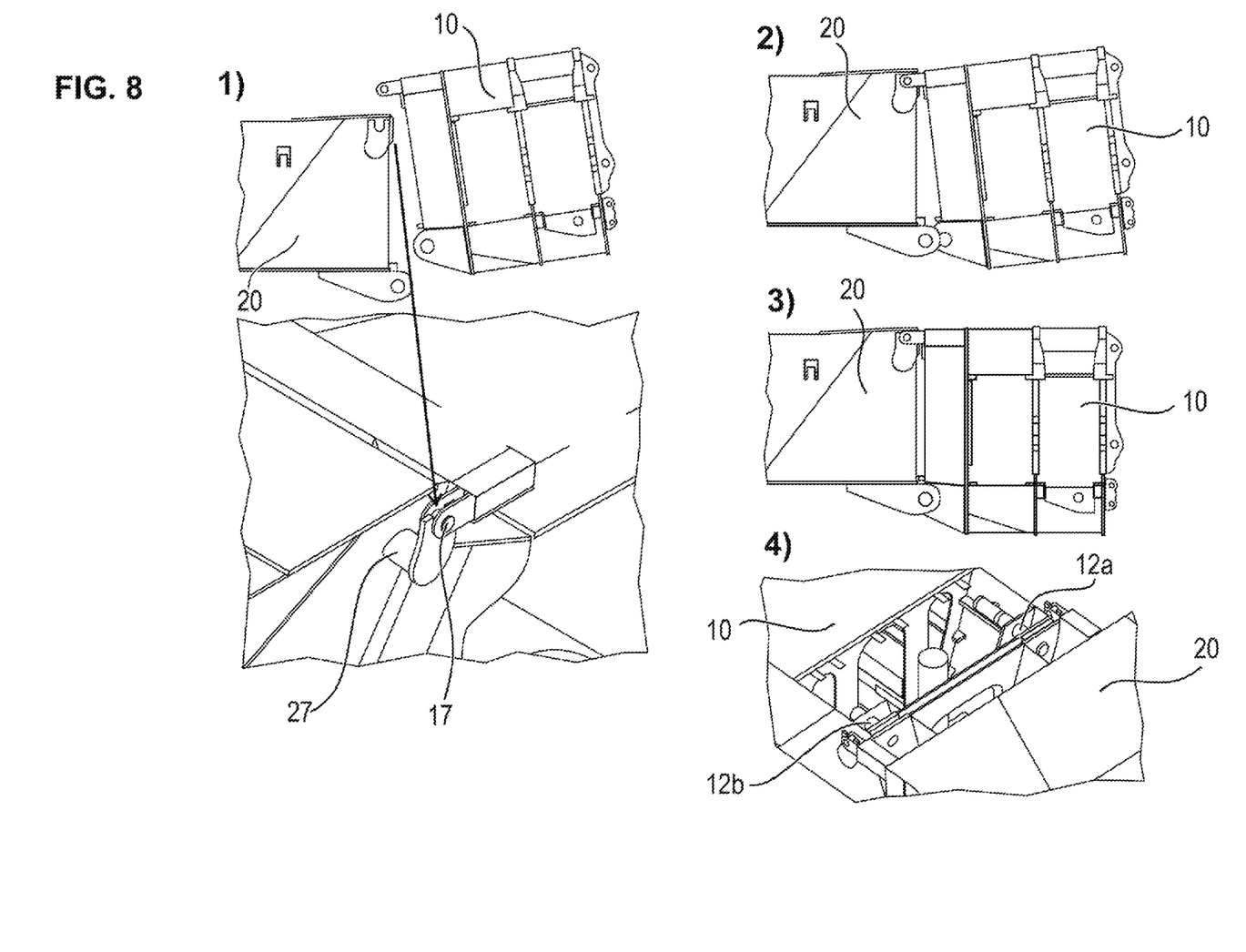
FIG. 8 shows a chronological representation of the installation procedure of the solution in accordance with the disclosure.

The individual installation steps which are shown by numerals 1 to 4 in chronological order in FIG. 8 will be looked at with reference to FIG. 8. The sliding beam box 10 is first threaded from above by means of the pins 17 into the centering aids 27 of the middle frame part 20. On the further lowering, the sliding beam box 10 is centered in accordance with the steps 1, 2. After the complete lowering, the sliding beam box 10 contacts the sliding beam box 20 with an exact fit (step 3). Finally, the respective two pins in the top chord and in the bottom chord are extended by their hydraulic drives and are correspondingly bolted. The last illustration number 4 here shows a plugged pin 12a and a pin 12b not yet plugged.

Since the sliding beam box or the supports received their optionally comprise one or more hydraulic and/or electric consumers, a hydraulic and/or electrical supply of the middle frame part 20 can simultaneously be ensured on the bolting of the sliding beam box 10 and the middle frame part 20. This is achieved by an electrical or hydraulic quick coupling 100 such as is shown in detail in FIGS. 10A-10B.

Figure 10A:
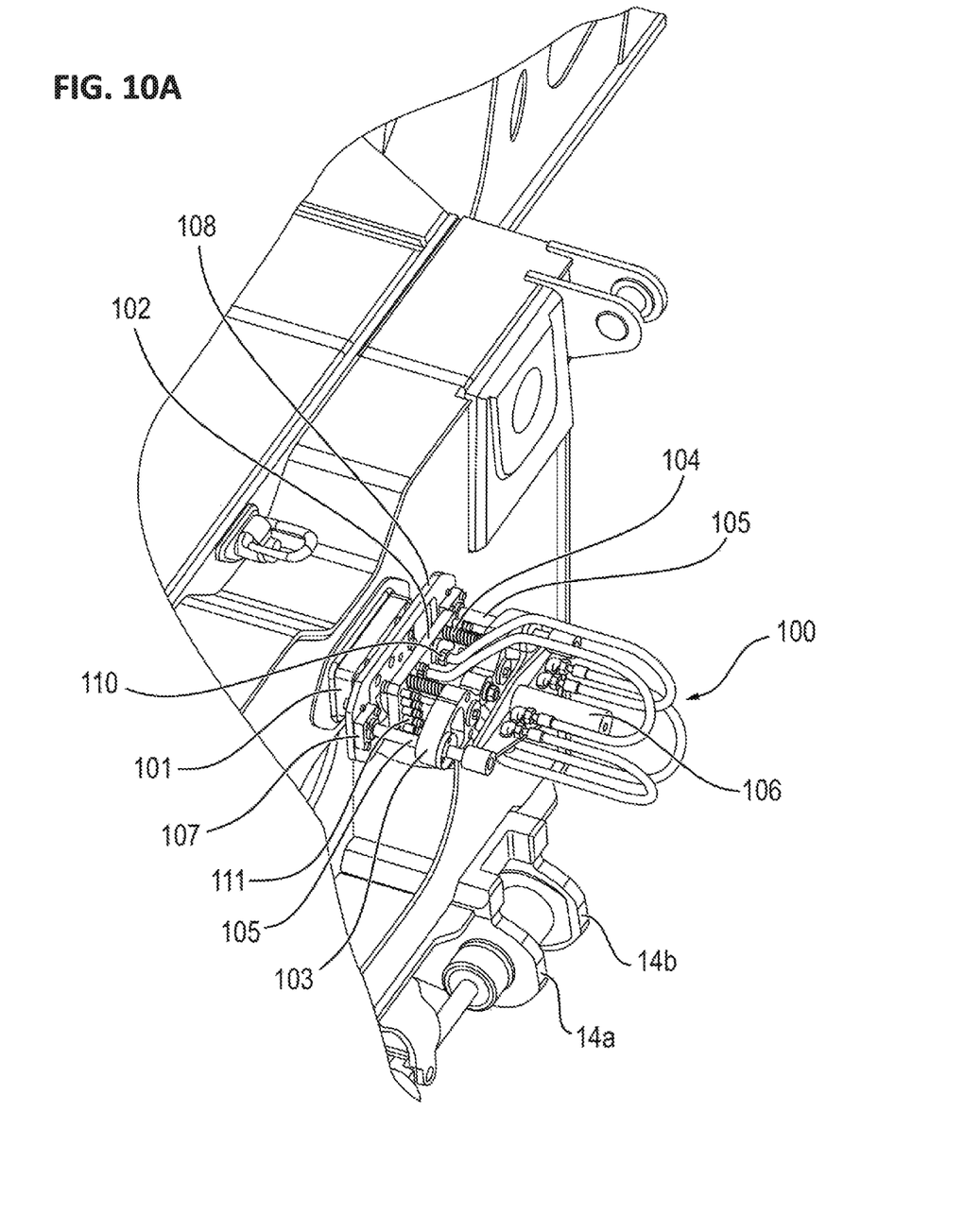
FIGS. 10A and 10B show two detailed representations of the quick coupling in the opened state and in the closed state.
Figure 10B:
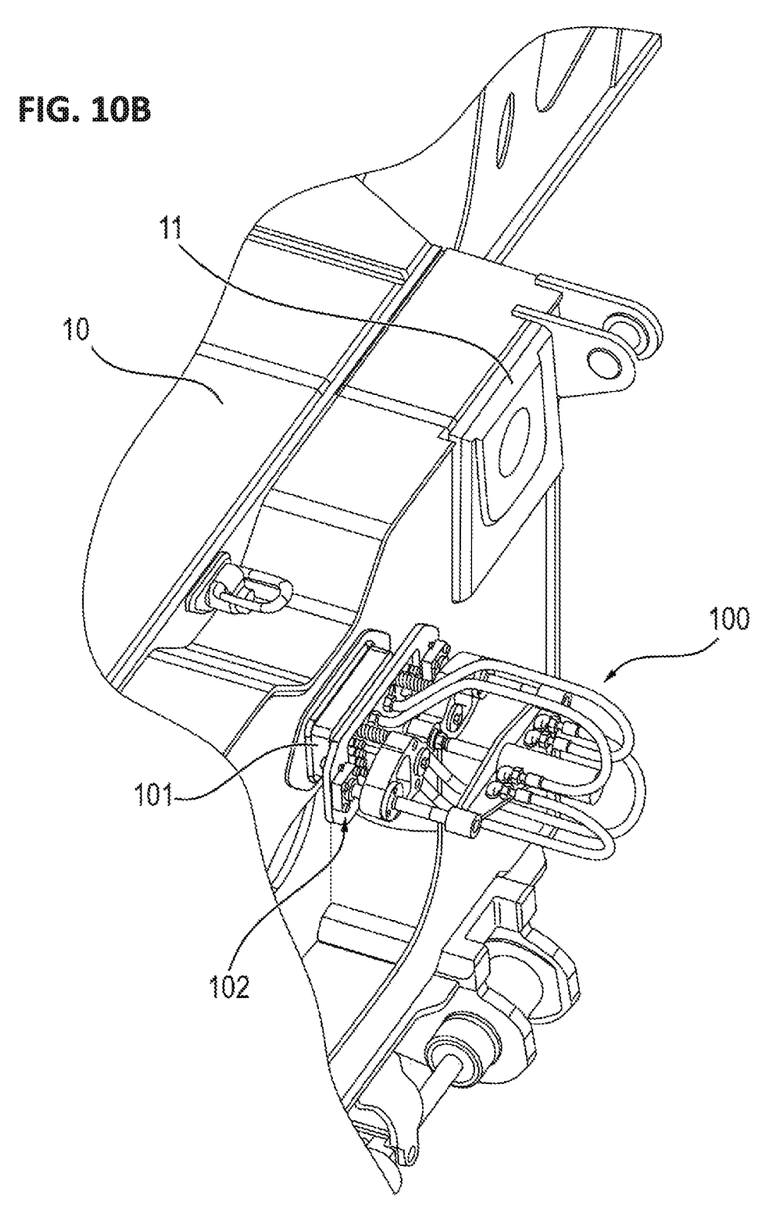

The specific location of the quick coupling 100 can be seen from FIG. 9; details of the coupling design are sown in FIGS. 10A and 10B, with FIG. 10A showing the opened coupling and FIG. 10B the closed coupling. A first coupling part 10 is fixedly installed at the adapter plate 11 of the sliding beam box 10. The complementary coupling part 102 is movably fastened to the middle frame part 20. Both coupling parts 101, 102 comprise plugs or sleeves that enable a hydraulic and/or electrical connection between the sliding beam box 10 and the middle frame part 20 on the joining together of the coupling parts 101, 102. Some of the plugs for the hydraulic lines are marked by reference numeral 110; the electrical plug elements have the reference numeral 111.

The coupling part 102 is, as already mentioned, movably supported at the middle frame part 20. The support is ensured by a slide 103 at which the coupling part 102 is resiliently supported by spring elements 104. The slide 103 itself is seated on a linear guide 105, whereby the latter can be displaced together with the coupling part 102 in the direction of the first coupling part 101 during the installation procedure. The linear guides 105 are fixedly screwed to the front surface of the middle frame part 20, not shown here, via adapter plates 107 and the frame part 108.

The carrying out of the linear displacement of the slide 103 takes place hydraulically via the piston-in-cylinder unit 106. A rough alignment of the coupling parts 101, 102 to one another already takes place during the installation procedure of the sliding beam box by the pins 12a, 12b, 23a, 23b. A fine centering of the coupling elements 101, 102 to one another takes place via the additional pins that project at the coupling part 102 and that engage into corresponding openings on the coupling part 101 during the coupling fit.

Figure 11:
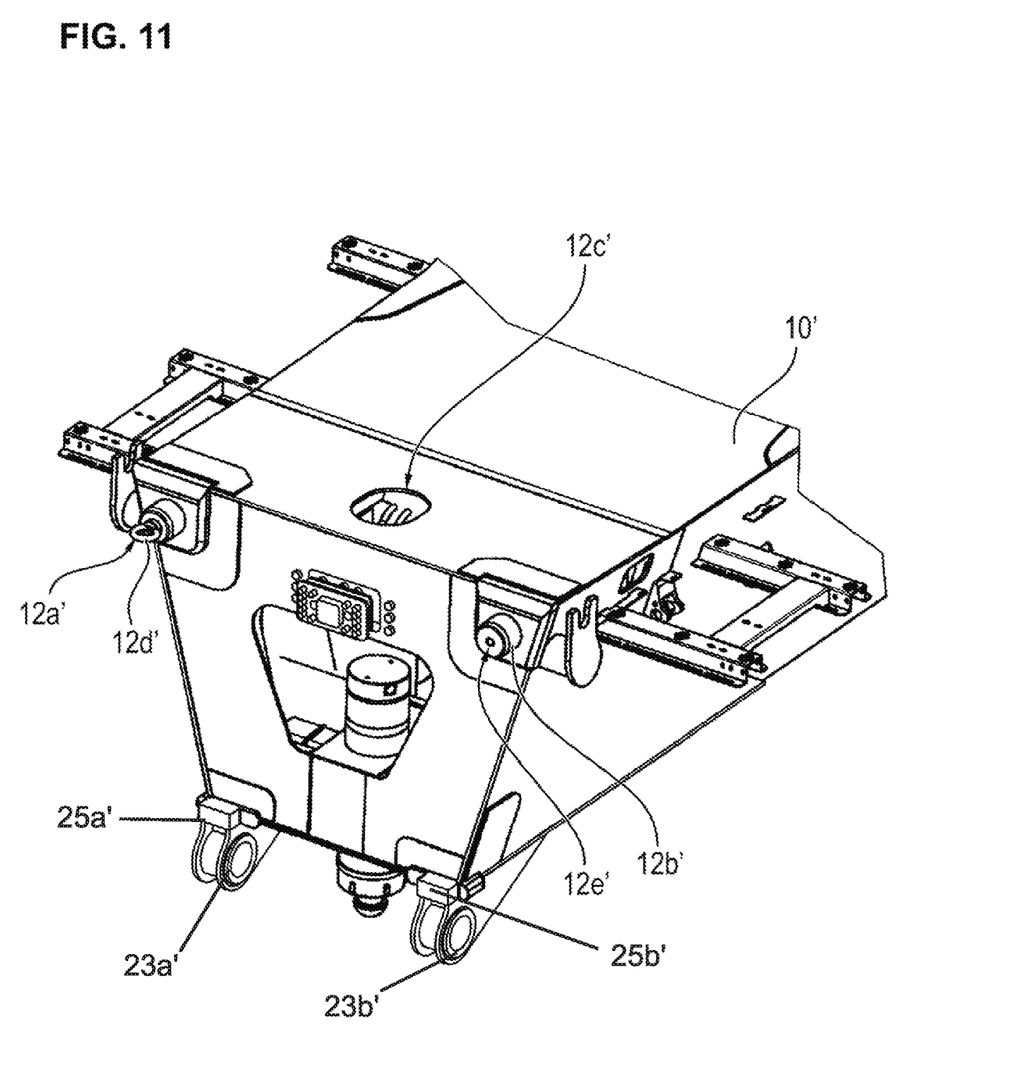
FIG. 11 shows a representation of the middle frame part of the vehicle frame in accordance with the disclosure in accordance with a modified embodiment.
Figure 12:
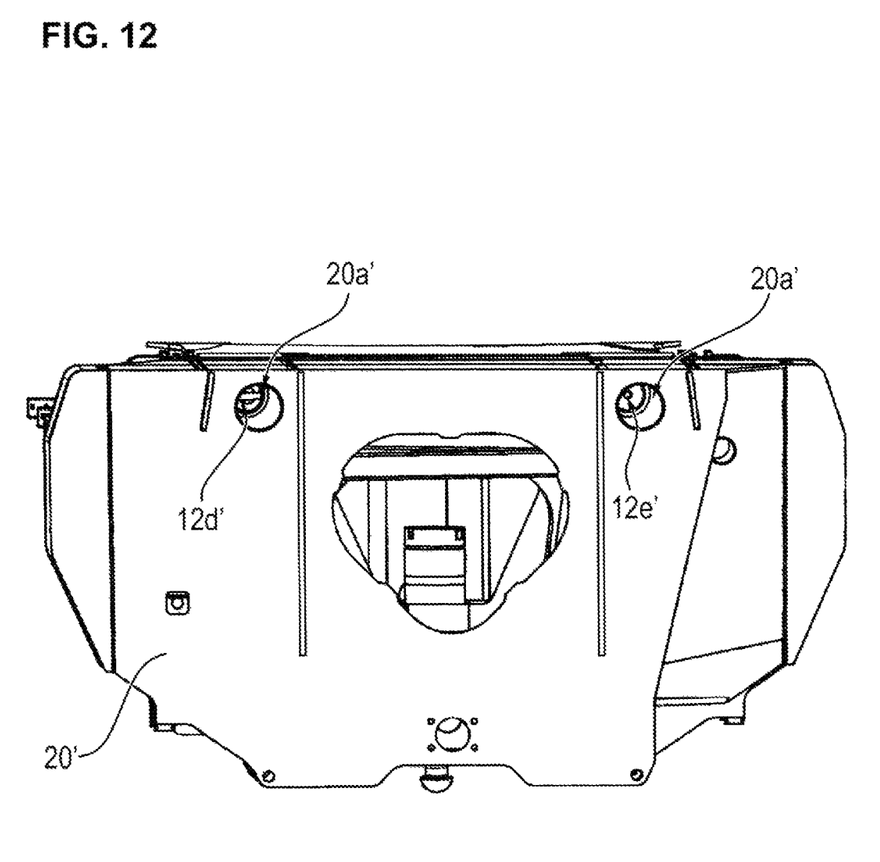
FIG. 12 shows the embodiment of FIG. 11 with a view toward the sliding beam box.

FIGS. 11 and 12 show a slightly modified embodiment of the vehicle frame in accordance with the disclosure. The pins 12a', 12b' and also the hydraulic drive 12c' for actuating the pins 12a', 12b' are accommodated at the top in the frame middle 10'. This has the advantage that in the event of a defect in the hydraulics 12c or on the seizing of the pins 12a', 12b' due to corrosion, the pins 12a', 12b' can be manipulated from the outside. This is possible by a direct access in the form of the cut-outs 20a' in the steel plate construction of the sliding beam box 20'. It is possible both to press or draw the pins 12a' 12b' using a bar. A ring receiver 12d' screwed into the pin 12a' for the manual actuation of the pin 12a' can be seen in FIG. 11. The ring receiver 12d' can be screwed into the thread 12e'.

The design of FIG. 11 and FIG. 12 furthermore provides dogs 25a', 25b' at the middle frame part 10'. The number of dogs is not related to the previously described design or arrangement of the pins 12a', 12b', i.e. the embodiments of FIGS. 6a-6c to FIGS. 10a-10b could be designed with at least two dogs.

The two dogs 25a', 25b' are configured above the pin connections 23a', 23b' at the bottom chord of the middle frame part 10' in the embodiment of FIG. 11 and FIG. 12. Since the dogs 25a', 25b' transmit the transverse force and are locally positioned directly at the bolting 23a', 23b', the transverse force for the metal plates of the bolting points 23a', 23b' is considerably reduced. In the embodiment with only one dog 25 at the center of the bottom chord, the bolt points 23a, 23b have to take over a considerably larger portion of the transverse force. The width of the bolting points 23a', 23b' are furthermore designed such that the transverse force that is taken up by the bolting points 23a', 23b' can also be taken up by them without damage.

The invention claimed is:

1. A vehicle frame for a mobile crane having a frame having a middle frame part that extends in a longitudinal vehicle direction, and having at least one sliding beam box for a support apparatus that is releasably bolted to a front-face rear end of the frame,
wherein
the bolting between the frame and the sliding beam box comprises at least two pins extending in the longitudinal vehicle direction and at least two pins extending transversely to the vehicle direction.

2. ThFe vehicle frame in accordance with claim 1, wherein the pins extending in the longitudinal vehicle direction stand perpendicular on an end-face front side of the frame or of a corresponding contact surface of the sliding beam box.

3. The vehicle frame in accordance with claim 2, wherein the contact surface in the region around at least one of the pins extending in the longitudinal vehicle direction serves as a force transmission surface, with this force transmission surface having a contact surface in the region around the at least one pin and with a corresponding counter-contact surface contacting the contact surface in the bolted state.

4. The vehicle frame in accordance with claim 2, wherein the contact surface of the sliding beam box is formed by an adapter plate corresponding to a profile form of the frame.

5. The vehicle frame in accordance with claim 1, wherein the at least two pins extending in the longitudinal vehicle direction are disposed in a region of a top chord of the frame or of the sliding beam box.

6. The vehicle frame in accordance with claim 1, wherein at least two pins extending transversely to the vehicle direction are disposed in a region of a bottom chord of the frame or sliding beam box.

7. The vehicle frame in accordance with claim 6, wherein the distance between the pins of the top chord differs from the distance between the pins of the bottom chord.

8. The vehicle frame in accordance with claim 1, wherein at least one dog is provided for transmitting transverse forces, with the dog being arranged in the region of a bottom chord of the frame/sliding beam box.

9. The vehicle frame in accordance with claim 8, wherein the dog or dogs is/are arranged in the region of the bottom chord of the frame and are connected with shape matching to a complementary dog receiver in the region of the bottom chord of the sliding beam box, with at least one respective dog being arranged in the region of the pin connection on a use of two or more dogs with respect to the longitudinal axis of the frame.

10. The vehicle frame in accordance with claim 1, wherein at least one centering aid for assembly of the sliding beam box is provided at the frame in the form of support points for receiving a transverse pin, with the support points being formed by upwardly open tabs laterally attached to the frame.

11. The vehicle frame in accordance with claim 1, wherein at least some of the pins are hydraulically adjustable.

12. The vehicle frame in accordance with claim 1, wherein complementary coupling parts for a hydraulic and/or electrical and/or pneumatic quick coupling are arranged at the frame and at the sliding beam box, with at least one of the coupling parts being movably supported at the frame or sliding beam box, and is resiliently received in or at a support plate that is movably supported at the frame or sliding beam box.

13. The vehicle frame in accordance with claim 12, wherein the movably supported coupling part is displaceably seated on a linear guide; and/or in that the support plate of the coupling part is displaceably seated on a linear guide, with at least one piston-in-cylinder arrangement being provided for carrying out the linear displacement and with the linear guide being fixed to the middle part of the vehicle frame.

14. The vehicle frame in accordance with claim 13, wherein a coupling part has at least one guide pin that engages into a centering bore of the oppositely disposed coupling part, with the at least one guide pin being arranged at the linearly displaceable coupling part.

15. A mobile crane comprising a vehicle frame, the frame having having a middle frame part that extends in a longitudinal vehicle direction, and having at least one sliding beam box for a support apparatus that is releasably bolted to a front-face rear end of the frame, wherein the bolting between the frame and the sliding beam box comprises at least two pins extending in the longitudinal vehicle direction and at least two pins extending transversely to the vehicle direction.

16. The vehicle frame in accordance with claim 7, wherein the distance between the pins of the top chord is larger than the distance between the pins of the bottom chord.

17. The vehicle frame in accordance with claim 8, wherein the dog is arranged between the at least two pins extending transversely to the direction of travel, and with the arrangement of the dog and the pins being designed symmetrically.

* * * * *